(12) United States Patent
Huang et al.

(10) Patent No.: US 8,934,371 B2
(45) Date of Patent: Jan. 13, 2015

(54) MONITORING BROADCAST AND MULTICAST STREAMING SERVICE

(75) Inventors: Yangcheng Huang, Athlone (IE); Liam Fallon, Athlone (IE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 120 days.

(21) Appl. No.: 13/695,581

(22) PCT Filed: Apr. 28, 2010

(86) PCT No.: PCT/EP2010/055663
§ 371 (c)(1),
(2), (4) Date: Jan. 4, 2013

(87) PCT Pub. No.: WO2011/134501
PCT Pub. Date: Nov. 3, 2011

(65) Prior Publication Data
US 2013/0107741 A1    May 2, 2013

(51) Int. Cl.
*G01R 31/08* (2006.01)
*H04L 12/26* (2006.01)
*G06F 17/30* (2006.01)
*H04L 12/18* (2006.01)
(Continued)

(52) U.S. Cl.
CPC .......... *H04L 43/00* (2013.01); *G06F 17/30539* (2013.01); *H04L 12/1863* (2013.01); *H04L 41/5009* (2013.01); *H04L 41/509* (2013.01); *H04L 65/4076* (2013.01); *H04L 65/80* (2013.01); *H04L 41/0677* (2013.01)
USPC ............ 370/252; 370/229; 370/235; 370/254

(58) Field of Classification Search
CPC . H04W 24/02; H04W 36/0083; H04W 16/18; H04W 72/06
See application file for complete search history.

(56) References Cited

U.S. PATENT DOCUMENTS

| 2003/0012194 A1 | 1/2003 | Novaes |
| 2008/0259921 A1 | 10/2008 | Nadarajah |
| 2011/0061084 A1* | 3/2011 | Bejerano et al. ............. 725/109 |

(Continued)

FOREIGN PATENT DOCUMENTS

| WO | WO 00/60864 | 10/2000 |
| WO | WO 2004/034726 | 4/2004 |

(Continued)

OTHER PUBLICATIONS

International Search Report for PCT/EP2010/055663, mailed Jan. 28, 2011.

(Continued)

*Primary Examiner* — David Oveissi
(74) *Attorney, Agent, or Firm* — Baker Botts, LLP

(57) ABSTRACT

A method of monitoring broadcast or multicast streaming service in a communications network comprising collecting (102) quality feedbacks related to the streaming service, determining (106) a maximum distance to a neighbor in a cluster and a minimum number of values required to form a cluster (106). The method further comprises grouping (108) collected values from the feedbacks into clusters based on the maximum distance to a neighbor in a cluster and the minimum number of values required to form a cluster and then mapping (112) the clusters onto topology of the network and determining (114) location of a problem causing degradation of the service.

16 Claims, 6 Drawing Sheets

(51) Int. Cl.
*H04L 12/24* (2006.01)
*H04L 29/06* (2006.01)

(56) References Cited

U.S. PATENT DOCUMENTS

| | | | | |
|---|---|---|---|---|
| 2011/0222669 A1* | 9/2011 | Buriano et al. | ............ | 379/32.01 |
| 2012/0102032 A1* | 4/2012 | Byrne et al. | .................. | 707/737 |
| 2013/0002968 A1* | 1/2013 | Bridge et al. | ................ | 348/744 |

FOREIGN PATENT DOCUMENTS

| WO | WO 2004/036845 | 4/2004 |
|---|---|---|
| WO | WO 2007/108816 | 9/2007 |
| WO | WO 2009/008829 | 1/2009 |

OTHER PUBLICATIONS

Quiroz et al., "Clustering Analysis for the Management of Self-monitoring Device Networks", *IEEE Computer Society*, 2008, pp. 55-64.
Ester et al., "A Density-Based Algorithm for Discovering Clusters In Large Spatial Databases with Noise", *2nd International Conf. on Knowledge Discovery and Data Mining*, No Date, 6 pgs.
Esmaelnejad et al., "A Novel Method to Find Appropriate for DBSCAN", No Date, 10 pgs.
Bellec et al., "Fuzzy Event Correlation Algorithm in Wide Telecommunication Networks", *International Journal of Multimedia and Ubiquitous Engineering*, vol. 3, No. 2, Apr. 2008, pp. 1-12.
Westerlund et al., "SDP and RTSP extensions defined for 3GPP Packet-switched Streaming Service and Multimedia Broadcast/Multicast Service", *Network Working Group*, Nov. 2009, 29 pgs.
DBSCAN definition, No date, 5 pgs.
Frodjh et al., "Adaptive Streaming within the 3GPP Packet-Switched Streaming Service", *IEEE*, 2006, pp. 34-40.
3GPP TR 26.937 LTE Technical Report, $3^{rd}$ Generation Partnership Project: Technical Specification Group Services and System Aspects; 44 pgs.
3GPP TS 26.234 LTE Technical Report, $3^{rd}$ Generation Partnership Project: Technical Specification Group Services and System Aspects; 155 pgs.
DBSCAN—Density-based spatial clustering of applications with noise (DBSCAN) from Wikipedia, Jul. 15, 2014.
DSL Forum; Technical Report TR-126; Triple-play Services Quality of Experience (QoE) Requirements; Produced by Architecture & Transport Working Group, Dec. 13, 2006.
"Receiver-driven Layered Multicast" by Steven McCanne, Van Jacobsen, and Martin Vetterli, 1995.
"Smooth Multirate Multicast Congestion Control" by Gu-In Kwon and John W. Byers, 2003.
"The RLC multicast congestion control algorithm" by Luigi Rizzo, Lorenzo Vicisano, and Jon Crowcroft, 1999.
"Providing congestion control in the Iub Transport Network for HDSPA" by Nádas et al., 2007.
"Stability and Fairness Issues in Layered Multicast" by Gopalakrishnan et al., Aug. 1999.

* cited by examiner

MONITORING BROADCAST AND MULTICAST STREAMING SERVICE

This application is the U.S. national phase of International Application No. PCT/EP2010/055663 filed 28 Apr. 2010 which designated the U.S., the entire content of which is hereby incorporated by reference.

TECHNICAL FIELD

The present invention relates to streaming services provided in communications networks, in general, and in particular to monitoring quality of multicast or broadcast streaming service.

BACKGROUND

Streaming has become increasingly important over the past few years, not only in the fixed Internet, but also in 2.5/3G/LTE mobile networks. In order to support continuous playout of a multimedia stream a transport network has to provide throughput which matches the rate of the encoded content (e.g. guaranteed bit-rate). If this requirement is not fulfilled a buffer underrun or overrun at the client side would occur.

A buffer underrun means that no more data can be played out at the client during re-buffering time (e.g. a frozen image on the screen). Therefore, it is more important to guarantee uninterrupted playout than guaranteeing completely error-free high-quality pictures.

A buffer overrun occurs since mobile devices have more stringent limits to their memory usage than PC clients. An overflow would have an effect equivalent to that of packet loss, as packets causing the overflow are discarded.

Best-effort networks cannot guarantee the same bit-rate during the session lifetime. In mobile networks, wireless links are often characterized by a varying throughput due to the nature of the wireless channel. In addition, different wireless access technologies (e.g. GPRS or HSDPA) pose different maximum limits on the average available bit-rate such that intersystem handovers will result in significantly different link characteristics.

In terms of multicast/broadcast traffic, although it is normally given higher priority than unicast traffic, congestion may still occur if bandwidth reservation is not used. Congestion is not a trivial issue for IPTV (fixed & mobile) services. It is crucial for service providers to closely monitor service quality of such multimedia streaming services and react if there is a problem.

Bit-rate adaptation, or adaptive streaming, is a solution described in M. Westerlund, P. Fröjdh, *SDP and RTSP extensions defined for 3GPP Packet-switched Streaming Service and Multimedia Broadcast/Multicast Service, Internet Draft*, Ericsson, draft-westerlund-mmusic-3gpp-sdp-rtsp-07, May 8, 2009 for Packet-switched Streaming Service (PSS). PSS is a unicast-based streaming service designed to deliver content at a quality level that requires a rate not exceeding the currently available transmission rate. This is done through varying the bit-rate based on the network conditions. The end-user is always given first the higher bit-rate according to its terminal capability. However, in case of network congestion, the bit-rate will be lowered in a dynamic and seamless way by a Streaming Server. Doing so, the network is less likely to drop packets due to congestion. The playback interruptions can be avoided and the objective playback quality will be at its maximum for the given transmission conditions.

The bit-rate adaptation is server centric, in the meaning that transmission and content bit-rate are controlled by the server, and the client just provides feedback about current buffer status and reception characteristics to the server. This allows the server for adapting the media streams, since it knows how the content is encoded. To support the bit-rate adaptation, the same content needs to be encoded in different bit-rates, but only one channel address is published to the client. The transition between the different bitrates occurs in a transparent way for the terminal which only sees a continuous stream.

Although very efficient for unicast streaming the bit-rate adaptation technique is not applicable to multicast or broadcast streaming because it is not capable of handling quality reports from multiple UEs.

A general assumption of the existing adaptive streaming is that network congestion is the cause of the service problems. This does not have to be true since many other factors, such as UE configuration errors and malfunction of intermediate network nodes, may lead to service problems with the same symptoms. If congestion is not the cause, the bit-rate adaptation may downgrade the media quality unnecessarily. In particular, all of the participants of the same multicast/broadcast session receive the same bit-rate and share the same delivery channel. Down-switch or up-switch of the bit-rate would affect all of the users of the same channel, even those with a very good service quality. Generally, it is unacceptable to downgrade the quality of the session for all users because a fraction of them is affected by the congestion. Because of this, it is not feasible to trigger a bit-rate down-switch (or up-switch) simply based on the observations at one UE (or even multiple UEs). For example, if the mobile TV client at one UE is mis-configured and keeps reporting low throughput, the bit-rate of the channel must not be down-switched to avoid the unfairness.

SUMMARY

It is the object of the present invention to obviate at least some of the above disadvantages and provide an improved method and apparatus for monitoring quality of streaming in multicast and broadcast service as well as for adapting the service to the quality changes.

According to a first aspect of the present invention there is provided a method of monitoring broadcast or multicast streaming service in a communications network. The method comprises collecting values of a parameter indicative of quality of the streaming service and then, based on those of the collected values that indicate quality of the streaming service above a predefined level, the method comprises determining a maximum distance to a neighbour in a cluster and determining a minimum number of values required to form a cluster. In the following step the collected values are grouped into clusters based on the determined maximum distance to a neighbour in a cluster and the minimum number of values required to form a cluster. Once the values are grouped into clusters the method comprises mapping the clusters onto topology of the network and determining location of a problem causing degradation of the service based on the mapping.

According to a second aspect of the present invention there is provided a network element for use in a communications network providing broadcast or multicast streaming service. The network element comprises a feedback analyser module and an interface to communicate with the communications network. The feedback analyser module is adapted to collect values of a parameter indicative of quality of the streaming service. The feedback analyser module is also adapted to determine a maximum distance to a neighbour in a cluster and to determine a minimum number of values required to form a cluster, wherein both determinations are based on the collected values that indicate quality of the streaming service above a predefined level. The feedback analyser module is further adapted to group the collected values into clusters based on the determined maximum distance to a neighbour in a cluster and the minimum number of values required to form a cluster and then map the clusters onto topology of the network. The feedback analyser module is also adapted to determine location of a problem causing degradation of the service based on the mapping.

According to a third aspect of the present invention there is provided a communications network comprising a streaming server providing broadcast or multicast streaming service to user equipment. The network also comprises network nodes and a network element, wherein said network element comprises a feedback analyser module and an interface to communicate with the communications network. The feedback analyser module is adapted to collect values of a parameter indicative of quality of the streaming service. The feedback analyser module is also adapted to determine a maximum distance to a neighbour in a cluster and to determine a minimum number of values required to form a cluster, wherein both determinations are based on the collected values that indicate quality of the streaming service above the predefined level. The feedback analyser module is further adapted to group the collected values into clusters based on the determined maximum distance to a neighbour in a cluster and the minimum number of values required to form a cluster and then map the clusters onto topology of the network. The feedback analyser module is also adapted to determine location of a problem causing degradation of the service based on the mapping.

Further features of the present invention are as claimed in the dependent claims.

BRIEF DESCRIPTION OF THE DRAWINGS

The present invention will be understood and appreciated more fully from the following detailed description taken in conjunction with the drawings in which.

DETAILED DESCRIPTION

Figure 1:
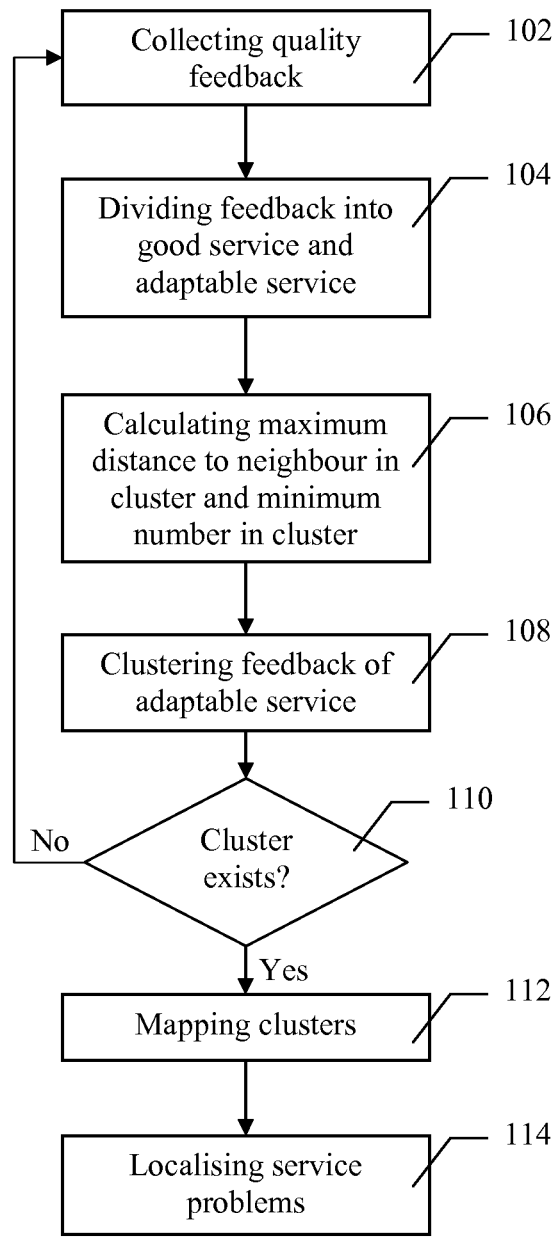
FIG. 1 is a diagram illustrating a method of monitoring broadcast or multicast streaming service in a communications network in one embodiment of the present invention.

With reference to FIG. 1 one embodiment of a method of monitoring broadcast or multicast streaming service in a communications network is presented. The method is based on a principle that user equipment (UE) that receive the streaming service at a good quality level report quality feedbacks in which values of a given quality parameter from various user equipment are above a certain predefined level and grouped (clustered) together, i.e. the difference between the values is small. The predefined level can be defined in requirements of the service. On the other hand, the user equipment which suffer from poor quality of the streaming service report their quality feedbacks with values of the quality parameter below the predefined level. When quality of the streaming service is negatively affected by a fault it is expected that quality feedbacks from a number of the user equipment affected by the same fault will be similar and therefore clustered.

The problem is how to identify clusters in the set of collected values and discard accidental values below the predefined level that are not result of malfunction on the side of the network, but, for example, result of wrong configuration of the user equipment.

In a multicast service the same content is sent to a group of user equipment (UE) that subscribed to this multicast service. In the case of a broadcast service the same content is sent to all user equipment in the network. It may be said that broadcast is just a special case of multicast and although there are some differences between technical aspects of implementing multicast and broadcast these differences are irrelevant for the present invention. Therefore for clarity of the description the more general term multicast will be used throughout the description.

In the embodiment illustrated in FIG. 1 the method comprises a step of collecting quality feedbacks in which values of a parameter indicative of quality of the streaming service is collected. There are various parameters that indicate quality of a streaming service and these include packet delay, packet loss ratio, etc. In alternative embodiments other or additional metrics collected as parameters indicating quality of a streaming service include packet loss and discard metrics (loss rate and discard rate), burst metrics (burst density and burst duration), delay metrics (round trip delay and inter-arrival jitter) and call quality or transmission quality metrics (R factor and Mean Opinion Score). Explanations of these metrics can be found: http://www.rfc-editor.org/rfc/rfc3611.txt The quality feedback may comprise values representing one or more of these parameters, but in the present embodiment values of only one parameter are collected. Once a number of collected samples (i.e. values of the quality parameter) from various parts of the network involved in the multicast service is collected the method comprises determining 106 a maximum distance to a neighbour in a cluster. The method also comprises a step of determining 106 a minimum number of values required to form a cluster. Having the maximum distance to a neighbour in a cluster and the minimum number of values required to form a cluster it is possible to analyse the set of values indicating poor quality of the streaming service. When two neighbouring values are spaced with a distance not bigger than the maximum distance to a neighbour in a cluster they may be part of a cluster. Whether there is a cluster depends on the number of values that form a chain in which all distances between neighbours is not bigger than the maximum distance to a neighbour in a cluster. If the population of the chain is not smaller than the minimum number of values required to form a cluster the chain is classified as a cluster. The determination of the maximum distance to a neighbour in a cluster and the minimum number of values required to form a cluster is based on the collected values which indicate quality of the streaming service above the predefined level (i.e. indicating a good quality of the streaming service). With the maximum distance to a neighbour in a cluster and the minimum number of values required to form a cluster known the collected values are grouped into clusters.

It is expected that quality feedbacks from user equipment affected by the same problem will be similar and their corresponding values will be clustered. In the next step the clusters are mapped 112 onto a topology of the network and then location of a problem that causes degradation of the service is determined 114 based on the mapping. The advantage of the present invention over known solution is that it allows for automated detection and localisation of service quality problems for multicast services.

The problem causing the degradation of the service may be a faulty physical entity, such as a faulty NE or link or a network card, or a malfunctioning software entity, such as a multicast thread running inside a node.

DBSCAN is a known clustering algorithm that allows for grouping of samples into clusters. It requires, however, manual configuration of parameters defining maximum distance to a neighbour in a cluster and a minimum number of values required to form a cluster. In embodiments of the present invention these parameters are determined automatically, in real time, based on the collected values of the quality parameter and do not require any manual configuration. Due to the requirement of manual configuration by an operator DBSCAN cannot be used in the present invention because any reaction of the operator to changes in the network would be too slow.

In a preferred embodiment the step of determining the maximum distance to a neighbour in a cluster and the minimum number of values required to form a cluster, 106, is preceded by dividing the collected values into two groups, 104. A first group contains values that indicate service of good quality (i.e. the values meet requirements defined for this particular service), a second group contains values that represent service below that defined level (also referred to as adaptable service). The separation of the values into the two groups can be implemented in one embodiment on-the-fly, which means that once the value is received it is immediately compared with the required threshold for good quality and assigned to one of the two groups depending on the result of the check. Alternatively, the values can be collected and then checked against the threshold. The check can be done periodically or, if the values are buffered, when the buffer level reaches a certain predefined level. The on-the-fly approach ensures better responsiveness of the method to changing conditions in the network, but requires processing power to be constantly allocated to this task. A combination of these two approaches is also possible and then the allocation of values to the groups is performed on-the-fly when there is no demand for the processing resources allocated to this task and switches to buffering collected data and allocating them later if the processing resource is requested by another process.

There may be situations in which the step of clustering the values corresponding to adaptable service (i.e. service with quality below the specified level) will produce no clusters. This will happen in situations when there are no real problems with quality of the service and if this happens, 110, the method continues collecting quality feedback 102.

During the step of clustering 108 it may be found that some of the values are located at distances from their neighbours bigger than the maximum distance to a neighbour in a cluster. These values do not belong to any cluster and in one embodiment are classified as noise and discarded from further processing. Similar situation may happen in the case described above when there is no cluster. The values that do not belong to any cluster indicate rather isolated problem related to individual UE rather than problem with the network and in such situations no adaptation of network parameters needs to be taken. One of the advantages of embodiments of the present invention is that they allow for filtering noise feedback based on cluster analysis. This means that there must be a minimum number of reports showing a similar problem to form a cluster and collected values that do not belong to a cluster are treated as noise and are discarded from further analysis. In this way a problem that affects an individual user do not trigger changes of transmission parameters that would affect other users.

The quality feedback containing values of the parameter indicative of quality of the streaming service can be received from various elements in the network and depend on particular implementation of the service and the network architecture. In one embodiment the values of the parameter indicative of quality of the streaming service are received from user equipment. In this embodiment one possible way of receiving the quality feedback from the user equipment is based on QoS reporting protocols like RTCP (Real-time Transport Protocol Control Protocol) or RTCP XR (which is an extended report for Quality of Experience, QoE). However, in some cases, such as MBMS (Multimedia Broadcast and Multicast Services) mobile TV solutions, uplink communication may not be available, for example, when UE receives MBMS traffic and then the quality feedback cannot be received from the UE. Example QoE metrics measured by an MBMS client are: corruption duration, successive loss of RTP packets, frame-rate deviation, and jitter duration.

Therefore, in alternative solutions the method comprises receiving quality feedback containing values of the parameter indicative of quality of the streaming service from network elements or service quality monitors even without a quality feedback from UE. The network elements on the path of the multimedia stream from the streaming service to the UE can detect or measure those parameters indicative of quality of the streaming service and send quality feedbacks. Intermediate nodes inside the network, such as edge routers can report quality feedback using MIB (Management Information Base) through SNMP (Simple Network Management Protocol) polling and SNMP traps, whereas radio base stations using ROP (Result Output Period) files. Also OSS (Operational Support System) can provide quality feedbacks related to streaming service provided in the network. Finally, dedicated quality monitors implemented in the network report detected quality of the streaming service. This is especially advantageous in applications of embodiments of this invention to monitoring multicast streaming service sessions with unidirectional bearers as provided, for instance, by 3GPP MBMS. In these embodiments the monitoring of service quality is realised by collecting and analyzing quality feedbacks from intermediate nodes of the network, instead of UEs and these nodes may include quality monitors.

It is, of course, possible that the quality feedbacks are received from all possible sources or from any combination of them.

The present invention does not require any input parameters in order to perform clustering of the collected values. The parameters required for the clustering operation are determined based on the collected results.

Figure 3:
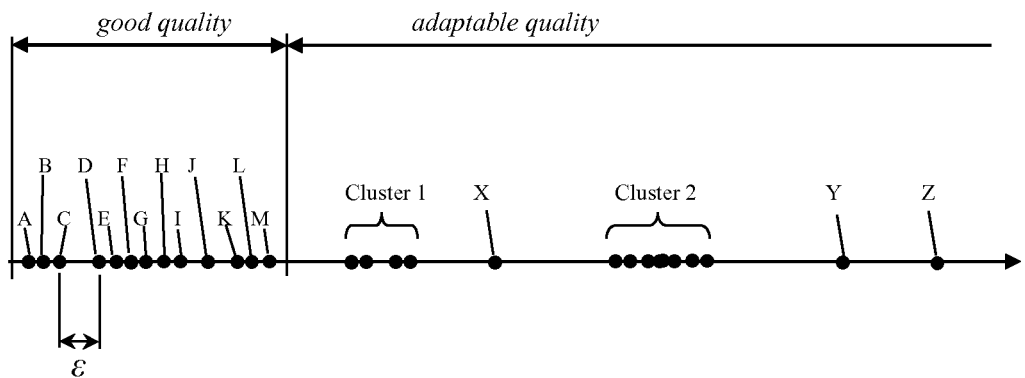
FIG. 3 is a diagram illustrating the principle of determining clustering parameters in one embodiment of the present invention.

In one embodiment the maximum distance between two neighbour values in the set of the collected values indicating that the quality of the streaming service is above the predefined level is used as the maximum distance to a neighbour in a cluster. FIG. 3 helps understanding the process of determining the required parameter. Once a number of quality feedbacks is received the values indicative of quality of the streaming service are divided into two groups, good service and adaptable service as shown in FIG. 3. The values in the group indicating good service (represented by points A-M) are analysed and the analysis shows that the distance between values C and D is the biggest in the set of values A-M. This value, marked as $\epsilon$, will be used as the maximum distance to a neighbour in a cluster. In practice it means that two neighbouring values in the group of values representing adaptable service can be members of a cluster only if the distance between them is not bigger than $\epsilon$.

Figure 3A:
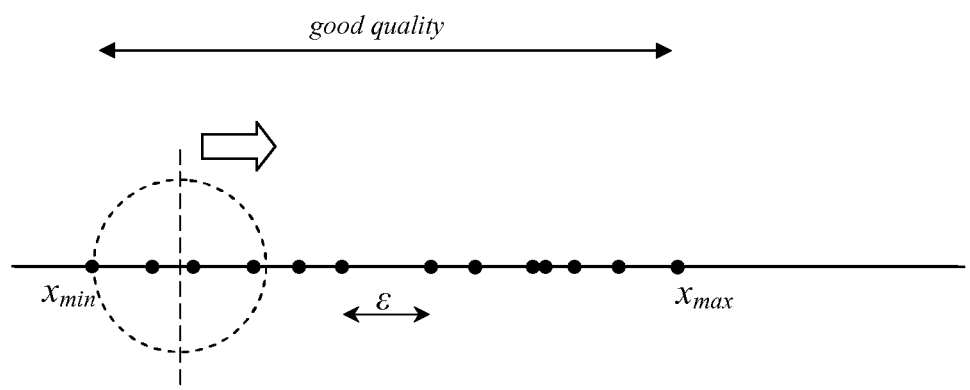
FIG. 3A is a diagram illustrating the principle of determining a minimum number of values required to form a cluster in one embodiment of the present invention.

For determining the minimum number of values required to form a cluster (which in effect defines population of the smallest cluster) the collected values indicative of quality of the streaming service above the predefined level (i.e. indicating good service) are also used. In one embodiment as the minimum number of values required to form a cluster is taken the smallest number of values corresponding to good service within a span of twice the maximum distance to a neighbour in a cluster, $\epsilon$. This is illustrated in FIG. 3A, where a circle of a radius $\epsilon$ is drawn from all points on the axis and the smallest number of values in a circle is the sought minimum number of values required to form a cluster. Of course, for one parameter indicative of quality of the streaming service the collected values will be on an axis as shown in FIG. 3A and in consequence the circle will be a segment of a length equal $2\epsilon$ (1-dimensional circle), but for clarity of the drawing and simplicity of explanation it is illustrated as a regular 2D circle.

As shown in FIG. 3A, the centre of the circle starts from $x_{min}+\epsilon$, and moves along the axis to the right. During such a process, the number of feedbacks falling into this circle is counted and the minimum number of feedbacks in a circle is determined—this is the sought minimum number of values required to form a cluster. The centre of the circle can be in any point on the axis in the range $(x_{min}+\epsilon; x_{max}-\epsilon$, where $x_{min}$ and $x_{max}$ are respectively the minimum and maximum values in the set of the collected values indicative of quality of the streaming service above a predefined level and $\epsilon$, as explained earlier, is the maximum distance to a neighbour in a cluster.

In accordance with this embodiment determining the maximum distance to a neighbour in a cluster and minimum number of values required to form a cluster resulted in two clusters (Cluster 1 and Cluster 2) in the part of FIG. 3 showing collected values of a quality parameter indicating adaptable quality. Points X, Y, Z do not belong to any cluster and are treated as noise.

In alternative embodiments the maximum distance to a neighbour in a cluster is calculated as a statistical function of distance between neighbours in the set of collected values indicating quality of the streaming service above the predefined level. The statistical functions that can be used in various embodiments include mean, median, variance, standard deviation or sample standard deviation. When using statistical functions two important aspects have to be considered. First, the set of values representing good quality service must be large enough to perform meaningful statistical operations. This should not be a problem in the case of broadcast service and also not a problem for multicast service with a large number of user equipment subscribed for the service. Second, the statistical functions will produce a value that is smaller than the maximum distance to a neighbour in a cluster, $\epsilon$, obtained in the first embodiment. This, in turn, would produce smaller clusters in the set of values representing adaptable service and the process of mapping the clusters on the topology of the network would result in improved precision of locating the source of the problem in the network. On the other hand, when the maximum distance to a neighbour in a cluster becomes too small, there may be no cluster at all. Therefore in a preferred embodiment the clustering of values in the set representing adaptable service is performed iteratively for different values of $\epsilon$ obtained in accordance with various embodiments based on the collected values indicating quality of the streaming service.

The embodiments of the invention discussed above covered situations when only one quality parameter is analysed. It has to be performed this way because two, or more, different parameters cannot be compared. Therefore in a preferred embodiment of the invention when the steps of the method are performed for one quality parameter similar analysis can be performed for another parameter indicative of quality of the streaming service. Even more preferably, a parallel, independent analysis is carried out for more than one quality parameter. This embodiment is especially advantageous because it may be that for one parameter there will be no clustering (no problem with this parameter), but clusters will be formed for one or more of the other parameters and the results of the analysis will be available with lower delay than in the case of performing the analysis on a one at a time basis. The quality feedbacks received contain a set of values representing various quality parameters and in the embodiment discussed herein only one of these values is used for analysis.

In one embodiment the method comprises monitoring quality of the service based on a cluster service quality model of said service. A cluster service quality model consists of a set of clusters of each service quality metrics (or parameter). For each cluster a centre vector and other clustering parameters, including a cluster radius and a cluster density (or the number of samples in the cluster), are given. Instead of recording all of sample values of a metric, the clusters are recorded and noise samples are ignored. The above cluster service quality model is compared to a probability density model (e.g. using probability density functions to describe distributions of the sample values). Advantages of the proposed cluster service quality model include greater accuracy and smaller overhead. The quality of the service is considered to be changed only if clustering behaviour is changed (e.g. existing clusters are broken and new clusters are formed). Clustering behaviour is changed when one or more parameter of a cluster (including the centre vector, the cluster radius and the density) is changed. The clustering is determined in real time as the quality feedbacks are received.

The cluster service quality model is used to describe the service quality per service rather than service quality per user. Instead of recording all of the values of a service performance metrics received from each user (for further analysis), the model only needs to record the clusters and ignores those outliers. A clustered view of service performance metrics is very useful in evaluating (and visualizing) service quality and changes of quality of the service.

Figure 2:
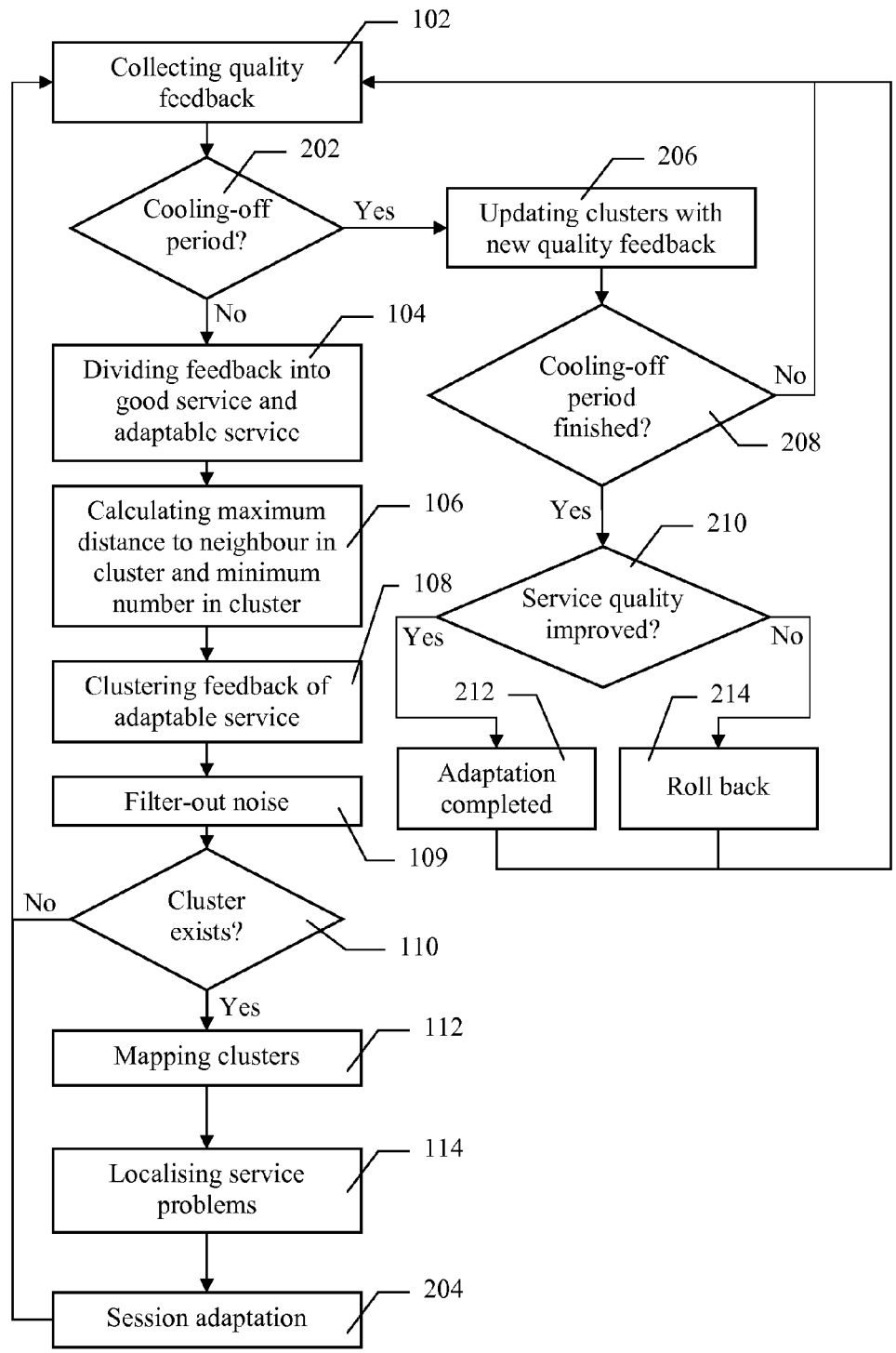
FIG. 2 is a diagram illustrating a method of monitoring broadcast or multicast streaming service in a communications network in an alternative embodiment of the present invention.

When service deterioration is detected and the location of the problem causing the deterioration is determined one embodiment of the present invention proposes a solution that mitigates the problem of lowered quality of service. This embodiment is illustrated in FIG. 2. A streaming server or an intermediate node along the session path is instructed, 204, to change one parameter of the streaming service. After the change values of the parameter indicative of quality of the streaming service are continued to be collected in order to determine if the change resulted in improved, 210, quality of the service.

In an alternative embodiment a streaming server or any other content source is instructed to initiate a new multicast session to network segments where the streaming service is degraded. In the new multicast session at least one parameter of the streaming service is changed compared with the original multicast session. After the new multicast session is initiated values of a parameter indicative of quality of the streaming service are collected in order to determine if the quality of the service changed in parts of the network where the new multicast session has been initiated. The content of the streaming service is provided by a streaming server (with functions like encoding and packetization), but in the network there are also content caches. Depending on the type and the implementation of the caching methods (e.g. caching packets or content), those caches are content sources for some UE, although they may not be considered as streaming servers.

When a multicast session is adapted by changing a parameter it is important that the quality of the session is monitored. It is also important that only one parameter is changed at a time. If more than one parameter is changed it is not clear which one of the changed parameters improved or even more degraded quality of the service. It is envisaged, however, that in specific situations of linked parameters (i.e. where change of parameter A causes change of parameter B) an alternative embodiment of the present invention allows for change of more than one parameter.

In order to determine the influence of the parameter change on the service quality a cooling-off period, 202, is introduced, as illustrated in FIG. 2. In this cooling-off period no other changes of the multicast session are allowed and quality feedbacks are collected. Clustering analysis of the collected feedback is carried out, 206, and once the cooling-off period expires, 208, it is checked if the service quality improved, 210. The length of the cooling-off period must be such that it allows collecting a sample of feedbacks large enough to perform the clustering analysis. The service quality is improved when size of a cluster(s) is reduced, when total number of quality feedbacks indicating adaptable service is reduced or when a cluster(s) ceases to exist after adaptation of the session. If the conclusion is that the service quality improved, 210, as a result of the session adaptation, the adaptation is completed, 212. The advantage of this approach is that the proposed incremental feedback collection during cooling-off period works in real-time with little overhead.

When the cooling-off period expires, 208, another parameter of the multicast streaming session can be adjusted if necessary.

It may be, however, that the change of the parameter does not bring the desired results and the clustering analysis, after expiry of the cooling-off period 208, shows that the service quality is not improved or deteriorated even more, 210. This indicates that a wrong parameter has been adjusted and the change of the parameter is rolled-back, 214, to the previous configuration of the streaming service and if there is any other alternative parameter that can be changed a similar adaptation of the session is performed. This, advantageously, allows for flexible adaptive streaming including multiple adaptation options based on collected feedbacks in which the rolling-back mechanism ensures that innocent end users that are not experiencing service quality problems would not be significantly affected.

Figure 4:
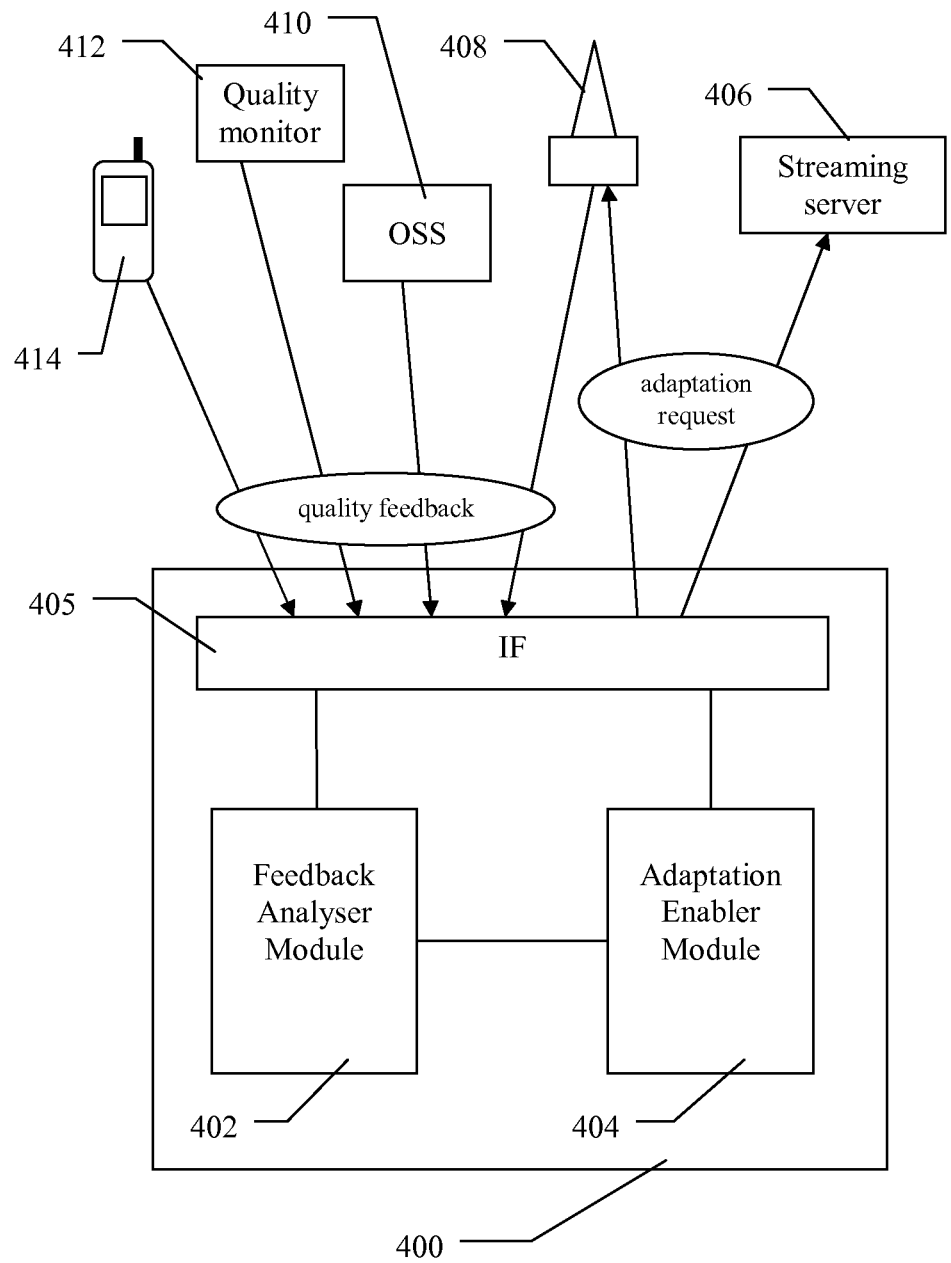
FIG. 4 is a diagram illustrating a network element in one embodiment of the present invention.

FIG. 4 illustrates a network element, 400, for use in a communications network providing broadcast or multicast streaming service. The network element 400 operates according to the embodiments of the method described earlier.

The network element 400 comprises an interface 405 to communicate with the communications network. In various embodiments the connection of the network element 400 to the communications network may be realised by a radio connection, a copper wire link, an optical link or any combination of these various types of connections. In order to operate the network element according to the various embodiments of the method of the present invention the network element 400 comprises a feedback analyser module, 402, which, in one embodiment, can be a microprocessor programmed to perform the operations of the method. Alternatively, the feedback analyser module, 402, can be realised by a digital signal processor (DSP) or a set of microprocessors, or DSPs, or both running software implementing an algorithm corresponding to embodiments of the method of the present invention.

In various embodiments of the present invention the feedback analyser module 402 is adapted to collect values of a parameter indicative of quality of the streaming service and to determine a maximum distance to a neighbour in a cluster, wherein the determination is based on the collected values that indicate quality of the streaming service above a predefined level. The feedback analyser module, 402, is adapted to determine a minimum number of values required to form a cluster and this determination is also based on the collected values that indicate quality of the streaming service above the predefined level. Other operations performed by the feedback analyser module, 402, include grouping the collected values into clusters based on the determined maximum distance to a neighbour in a cluster and the minimum number of values required to form a cluster. Once this is done, the feedback analyser module, 402, maps, 112, the clusters onto topology of the network and the mapping operation allows determining location, 114, of a problem causing degradation of the service.

Preferably, the network element, 400, comprises an adaptation enabler module, 404, in communication with the feedback analyser module 402.

In one embodiment the adaptation enabler module, 404, is a hardware module (microprocessor, DSP or a multiprocessor device) physically separate from the feedback analyser module, 402, wherein the processor implementing the function of the adaptation enabler module 404 runs under control of software implementing steps of the method.

Alternatively, the feedback analyser module, 402, and adaptation enabler module, 404, are realised as two or more logical modules running in one or more hardware modules.

In a preferred embodiment the adaptation enabler module, 404, instructs a streaming server 406 or an intermediate node 408 along the session path of the streaming multicast service to change a parameter of the streaming service on a link where the service is degraded. The feedback analyser module 402 monitors quality of the streaming service also after the change of the parameter (in the cooling-off period) in order to determine if the change brought the desired effect (improved service quality).

Alternatively, the adaptation enabler module, 404, instructs the streaming server, 406 to remove user equipment affected by the degradation of the streaming service from their current multicast group, then establish a new multicast group with different parameters and add the removed user equipment to the new multicast group. When the user equipment that suffered deterioration of the service is separated and a special multicast group with adjusted at least one parameter is formed for this equipment quality of the streaming service is monitored in order to find out how the change affected service quality in the newly formed multicast group.

Figure 6:
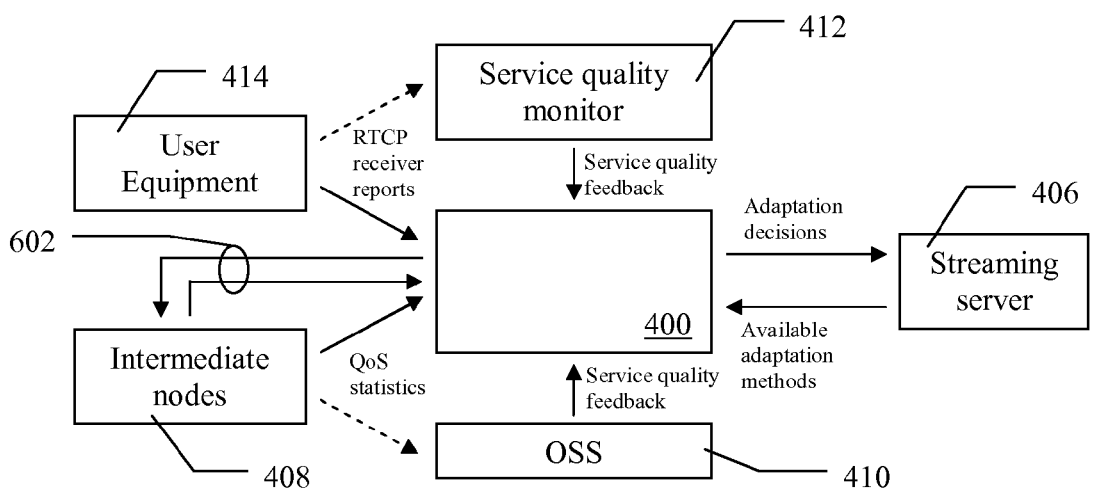
FIG. 6 is a diagram illustrating interactions of the network element and a communications network in one embodiment of the present invention.
Figure 7:
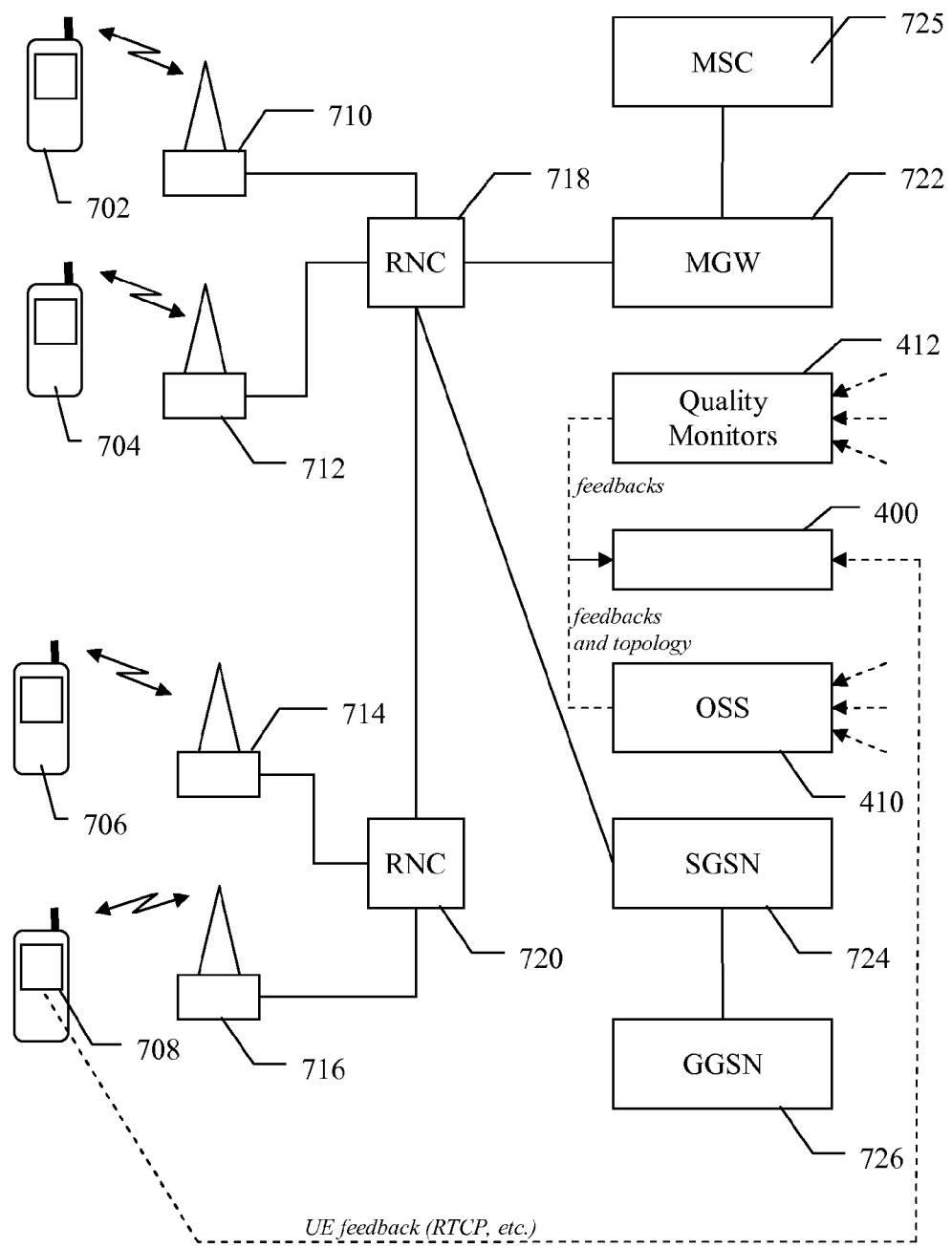
FIG. 7 is a diagram illustrating a communications network in one embodiment of the present invention.

FIGS. 6 and 7 illustrate a communications network, 700, operating in accordance with the method of the present invention. The network, 700, comprises a streaming server, 406, which provides broadcast or multicast streaming service to user equipment 702-708. The user equipment, 702-708, access the network via radio base stations, 710-716 (also known as NodeBs or eNodeBs depending on the generation of the communications network). In addition to the radio base stations 710-716 the communications network 700 in various embodiments may also comprise other network nodes, 718-726, including mobile switching centre, 725, radio network controllers 718, 720, media gateway(s) 722, Serving GPRS Support Node(s) 724 and Gateway GPRS Support Node(s) 726, where GPRS stands for General Packet Radio Service.

In the embodiment illustrated in FIG. 7 elements 400, 410 and 412 of the network are illustrated without physical connections to the remaining elements of the network 700. Instead dashed lines illustrate information received by the elements 400, 410 and 412. The elements 400, 410 and 412 can be connected to various other elements of the network 700 and connecting them would not be a problem for a person skilled in the art. For correct operation, in accordance with embodiments of the present invention, these elements require specific information, and this information can be delivered directly or via other elements of the network 700.

The communications network 700 also comprises a network element 400 described above, which has a feedback analyser module 402 for collecting service quality feedbacks and analysing the collected feedbacks based on clustering of the received data and an interface 405 to communicate with the communications network 700. As described above the feedback analyser module, 402, is adapted to determine location, 114, of a faulty element (physical or logical) of the network that causes deterioration of the streaming service quality. The determination of location is based on mapping clusters determined in the analysis onto the topology of the network 700. Preferably the network element 400 also comprises an adaptation enabler module 404 connected to the feedback analyser module 402. In this embodiment, in addition to identifying location of the problem causing degradation of the service, the network 700 can also change parameters determining how the multimedia stream is transmitted to at least some of the user equipment 414, 702-708. The adaptation enabler module, 404, instructs a streaming server 406 or an intermediate node 408, 710-726 along the session path to change a parameter of the streaming service on a link where the service is degraded.

FIG. 6 illustrates the elements of the communications network and communication exchanged between these elements. The arrows in this figure illustrate information flow and not connections, which means that although the arrows may show a direct transfer between different elements the elements may not be physically directly connected to each other. A user equipment 414 in the embodiment illustrated in FIG. 6 receives a multicast streaming service (i.e. the user equipment 414 is a member of a multicast group) and sends reports on quality of the service to the network element 400 where, via the interface 405, the feedback analyser module 402 collects them. The user equipment 414 uses RTCP reporting protocol to provide its quality feedback. Optionally, the quality feedback may be also sent from the user equipment 414 to a service quality monitor module 412. The contents of the quality feedbacks sent to network element 400 and quality monitor 412 may be the same, but may also be different, depending on embodiment. The network element 400 receives, 602, reports on quality of the service also from other elements, 408, of the network involved in delivering the multimedia stream to the user equipment 414. Operational Support System, OSS 410, has also knowledge about service quality of the multicast service (e.g. via reported to the OSS events and maintained counters) and this is also reported to the network element 400. The OSS 410 also keeps information on topology of the network 700 and gives this information to the network element 400. With all this information available the network element 400 carries out clustering analysis as described earlier and determines location of the problem. Once this is determined the network element 400 investigates what adaptation methods are available in this particular case (different bit-rate, different coding and/or modulation, etc. . . . ) and then sends instructions on how the service should be adapted. These instructions can be sent to the streaming server 406 or to intermediate node(s) 408, as illustrated by arrow 602.

One of possible causes of degraded quality of service experienced by users is congestion. Congestion in most cases would be rather localized and hence affect only a portion of the users. It should be avoided to downgrade the quality of the session and thus affect all the users because only some of them are affected by congestion in part of the network. To solve the problem of such a "collective impact" this invention advantageously uses in one of its embodiment a layered multicast as one of the options of session adaptation.

In one embodiment, after receiving adaptation requests from the feedback analyzer module 402, the adaptation enabler module 404 checks if the streaming server (content server or encoder) supports a layered multicast streaming mode. If the layered multicast mode is supported, the adaptation enabler module 404 asks the streaming server to change from the previous single-layer multicast mode to the layered multicast mode.

Figure 5:
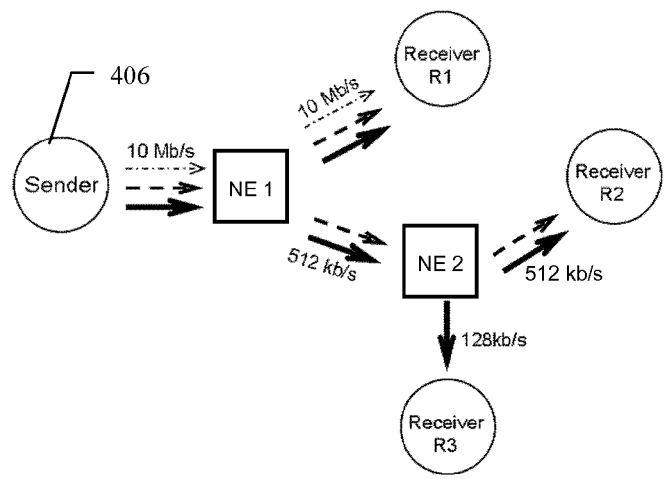
FIG. 5 is a diagram illustrating the principle of layered multicast used in one embodiment of the present invention.

In one embodiment, as illustrated in FIG. 5, the streaming server 406 begins to transmit three layers of video to receivers R1, R2 and R3. Because the path capacity from the sender, 406, via network element NE1 to R1 is high (10 Mb/s), R1 can successfully subscribe to all three layers and receive the best video quality. However, the path to R2 or R3 goes additionally via network element NE2 and would get congested if R2 or R3 subscribe to all three layers. Therefore, R2 reacts to this congestion by dropping layer three (and receives at data rate 512 kb/s), and R3 only subscribes to one layer due to the limited capacity (128 kb/s).

In this way, multicast receivers R1-R3 adapt to both the static heterogeneity of link bandwidths as well as dynamic variations in network capacity (i.e. congestion). The major difference between this invention and existing receiver-based layered multicast solution is the way of decision making in layer subscription. There are two embodiments proposed in this invention.

1: using clustering results in making decisions about layer selection. This invention may use clustered service quality feedback to decide how many layers the receivers should subscribe to.

For example, if receiver R2 belongs to one cluster, R2 would drop layer three; however, if receiver R3 belongs to another cluster (large packet drop ratio and large delay), R3 only subscribes to the base layer. There would be no changes of layer subscriptions (i.e. layer shifting) unless the receiver moves from one cluster to another. The benefits of this is reduced layer shifting by filtering transient service degradation feedback and making full use of resources.

2: the receivers only keep the base layer when congestions occur.

This embodiment is simpler and solves the problem of instability (i.e. frequent layer shifting); however in this embodiment the resources may not be fully utilized.

The proposed invention in its various embodiments can be implemented in hardware or software and it can be implemented inside a streaming server or other network element, or separately as a standalone element of a communications network.

The invention claimed is:

1. A method, for use in a network element, of monitoring broadcast or multicast streaming service in a communications network, the method comprising:
collecting, by the network element, values era parameter indicative of quality of the streaming service each value associated with a user equipment receiving the streaming service;
automatically determining, by the network element, attributes that form a cluster for neighboring user equipment receiving the streaming service, the automatically determining attributes that form the cluster of neighboring user equipment comprising
determining, by the network element, a maximum geographical distance between two neighbor user equipments of the cluster, wherein the determining, the maximum distance is based on the collected values that are above a predefined level; and
determining, by the network element, a minimum number of the collected values required to form the cluster, wherein the determining the minimum number of the collected values is based on the collected values that are above the predefined level;
grouping, by the network element, the collected values that are below the predefined level into clusters based on the automatically determined attributes that form the cluster;
mapping, by the network element, the clusters onto a topology of the network; and
determining, by the network element, a location of a problem causing degradation of the streaming service based on the mapping.

2. The method according to claim 1 wherein collecting values of the parameter indicative of quality of the streaming service comprises receiving values of the parameter indicative of quality of the streaming service from user equipment.

3. The method according to claim 1 wherein collecting values of the parameter indicative of quality of the streaming service comprises receiving values of the parameter indicative of quality of the streaming service from network elements and/or service quality monitors.

4. The method according to claim 1, wherein the determining the maximum geographical distance between two neighbour user equipments of the cluster comprises determining the maximum distance between two neighbor user equipments, wherein each of the neighbor user equipments is associated with a value of the parameter indicative of quality of the streaming service that is above the predefined level.

5. The method according to claim 1, wherein the determining the maximum geographical distance between two neighbour user equipments of the cluster comprises calculating a statistical function of distance between two neighbor user equipments, wherein each of the neighbor user equipments is associated with a value of the parameter indicative of quality of the streaming service that is above the predefined level.

6. The method according to claim 1, wherein determining the minimum number of the collected values required to form the cluster comprises determining the smallest number of user equipments within a geographical distance of twice the determined maximum geographical distance between two neighbour user equipments of the cluster; and
wherein the determining the smallest number of user equipments comprises determining the number of used equipments within a geographical distance of twice the determined maximum geographical distance between two neighbour user equipments of the duster for all values in the range $(x_{min}+\epsilon, x_{max}-\epsilon)$, where $x_{min}$ and $x_{max}$ are respectively the minimum and maximum values of the collected values indicative of quality of the streaming service that are above a predefined level and $\epsilon$ is the maximum geographical distance between two neighbour user equipments of the cluster.

7. The method according to claim 1, wherein the steps are performed for more than one parameter indicative of quality of the streaming service.

8. The method according to claim 1, wherein grouping the collected values that are below the predefined level into dusters based on the automatically determined attributes that form the cluster comprises discarding from further analysis the collected values that are not assigned to any cluster.

9. The method according to claim 1 further comprising:
instructing a streaming server or an intermediate node along a path of the streaming service to change at least one parameter of the streaming service; and
collecting values of a parameter indicative of quality of the streaming service.

10. The method according to claim 1 further comprising:
instructing a streaming server or any other content source to initiate a new multicast session to network segments where the streaming service is degraded with at least one parameter of the streaming service, changed compared with an original multicast session to the network segments where the streaming service is degraded; and
collecting values of a parameter indicative of quality of the streaming service.

11. A network element for use in a communications network providing broadcast or multicast streaming service comprising a feedback analyser module and an interface to communicate with the communications network, wherein the feedback analyser module is configured to:
collect values of a parameter indicative of quality of the streaming service, each value associated with a user equipment receiving the streaming service;
automatically determine attributes that form a cluster of neighboring user equipments receiving the streaming service, wherein automatically determining attributes that form the cluster of neighboring user equipments comprises:
determining a maximum geographical distance between two neighbour user equipments of the cluster, wherein the determining the maximum geographical distance is based on the collected values that indicate quality of the streaming service that are above a predefined level; and
determining a minimum number of the collected values required to form the cluster, wherein the determining the minimum number of the collected values is based on the collected values that indicate quality of the streaming service that are above the predefined level;
the feedback analyser module further configured to:
group the collected values that are below the predefined level into clusters based on the automatically determined attributes that form the cluster;
map the clusters onto a topology of the network; and
determine a location of a problem causing degradation of the streaming service based on the mapping.

12. The network element according to claim 11 comprising an adaptation enabler module in communication with the feedback analyser module, wherein the adaptation enabler module is configured to instruct a streaming server or an intermediate node along a path of the streaming service to change a parameter of the streaming service; and the feedback analyser module is adapted to monitor quality of the streaming service.

13. The network element according to claim 11 comprising an adaptation enabler module in communication with the feedback analyser module, wherein the adaptation enabler module is configured to instruct a streaming server to:
- remove user equipment affected by the degradation of the streaming service from their current multicast group;
- establish a new multicast group with different parameters and add the removed user equipment to the new multicast group; and
- monitor quality of the streaming service.

14. A communications network comprising a streaming server providing broadcast or multicast streaming service to user equipment, network nodes and a network element, wherein said network element comprises a feedback analyser module and an interface to communicate with the communications network, wherein the feedback analyser module is configured to:
- collect values of a parameter indicative of quality of the streaming service, each value associated with a user equipment receiving the streaming service;
- automatically determine attributes that form a cluster of neighboring user equipments receiving the streaming service, wherein automatically determining attributes that form the cluster of neighboring user equipments comprises:
  - determining a maximum geographical distance between two neighbour user equipments of the cluster, wherein the determining the maximum geographical distance is based on the collected values that indicate quality of the streaming service that are above a predefined level; and
  - determining a minimum number of the collected values required to form the cluster, wherein the determining the minimum number of the collected values is based on the collected values that indicate quality of the streaming service that are above the predefined level;

the feedback analyser module further configured to:
- group the collected values that are below the predefined level into clusters based on the automatically determined attributes that form the cluster;
- map the clusters onto a topology of the network; and
- determine a location of a problem causing degradation of the streaming service based on the mapping.

15. The communications network according to claim 14, wherein the network element comprises an adaptation enabler module in communication with the feedback analyser module, wherein the adaptation enabler module is configured to instruct a streaming server or an intermediate node along a path of the streaming service to change a parameter of the streaming service; and the feedback analyser module is adapted to monitor quality of the streaming service.

16. The communications network according to claim 14, wherein the network element comprises an adaptation enabler module in communication with the feedback analyser module, wherein the adaptation enabler module is configured to instruct a streaming server to:
- remove user equipment affected by the degradation of the streaming service from their current multicast group;
- establish a new multicast group with different parameters and add the removed user equipment to the new multicast group; and
- monitor quality of the streaming service.

* * * * *

UNITED STATES PATENT AND TRADEMARK OFFICE
CERTIFICATE OF CORRECTION

PATENT NO.         : 8,934,371 B2                                     Page 1 of 1
APPLICATION NO.    : 13/695581
DATED              : January 13, 2015
INVENTOR(S)        : Huang et al.

It is certified that error appears in the above-identified patent and that said Letters Patent is hereby corrected as shown below:

In the Claims

In Column 13, Line 63, in Claim 6, delete "used" and insert -- user --, therefor.

In Column 13, Line 66, in Claim 6, delete "duster" and insert -- cluster --, therefor.

In Column 14, Lines 10-11, in Claim 8, delete "dusters" and insert -- clusters --, therefor.

In Column 14, Line 24, in Claim 10, delete "service," and insert -- service --, therefor.

Signed and Sealed this
Fourteenth Day of July, 2015

Michelle K. Lee
*Director of the United States Patent and Trademark Office*